April 4, 1944. A. L. OSROW 2,345,769
ELECTRIC TOASTER AND COOKER
Filed Oct. 16, 1940 3 Sheets-Sheet 2
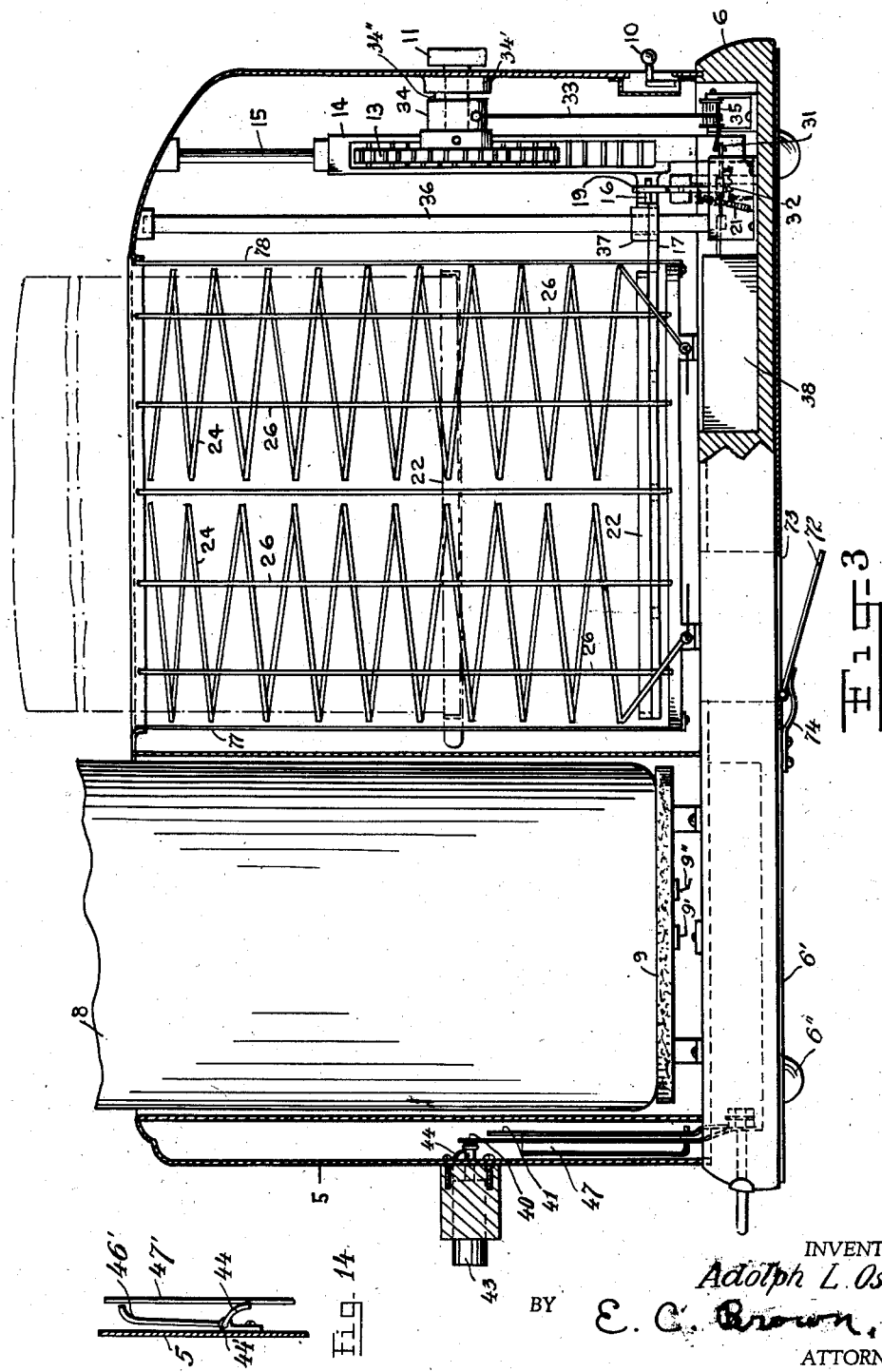
INVENTOR:
Adolph L. Osrow
BY E. C. Brown
ATTORNEY.

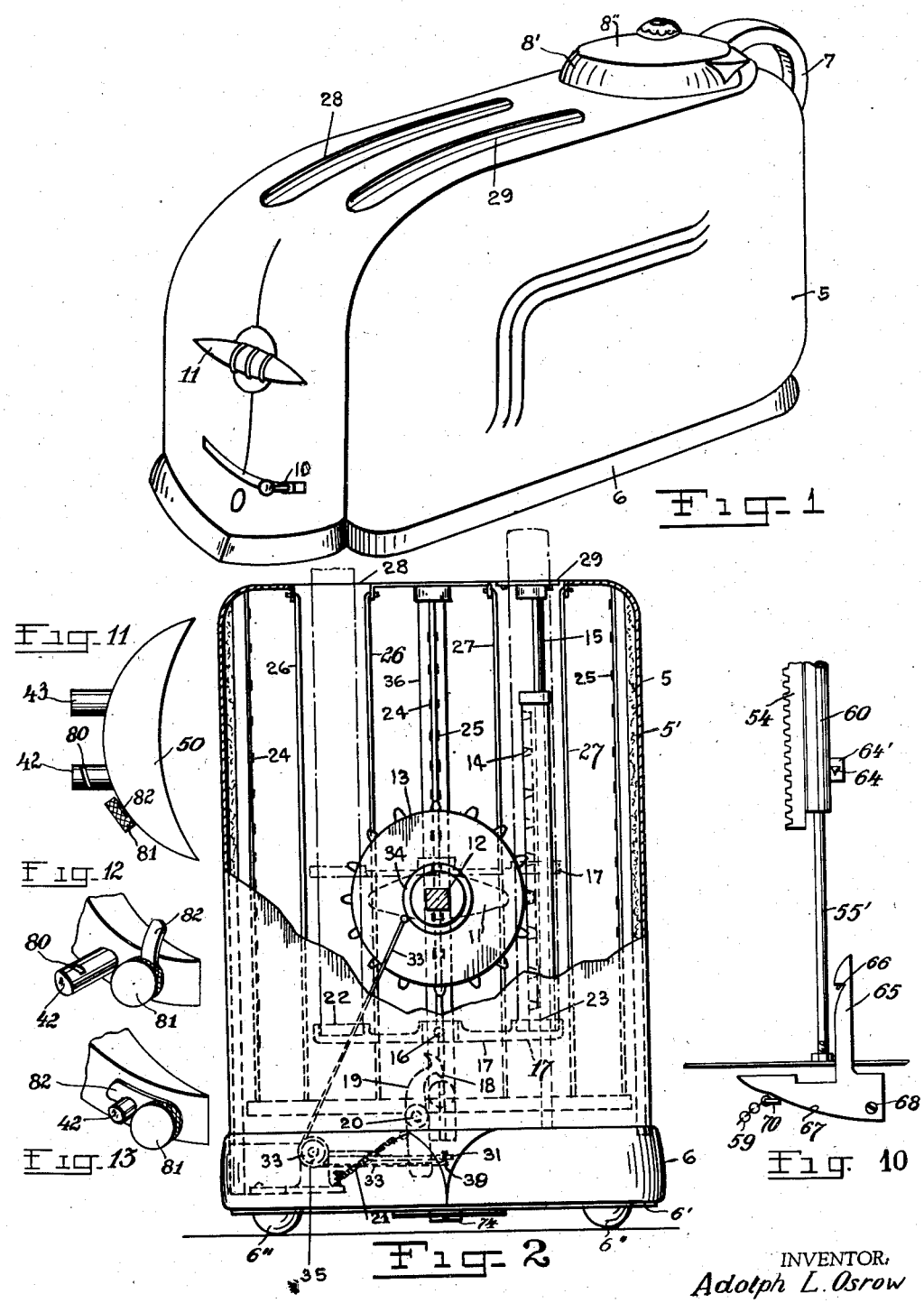

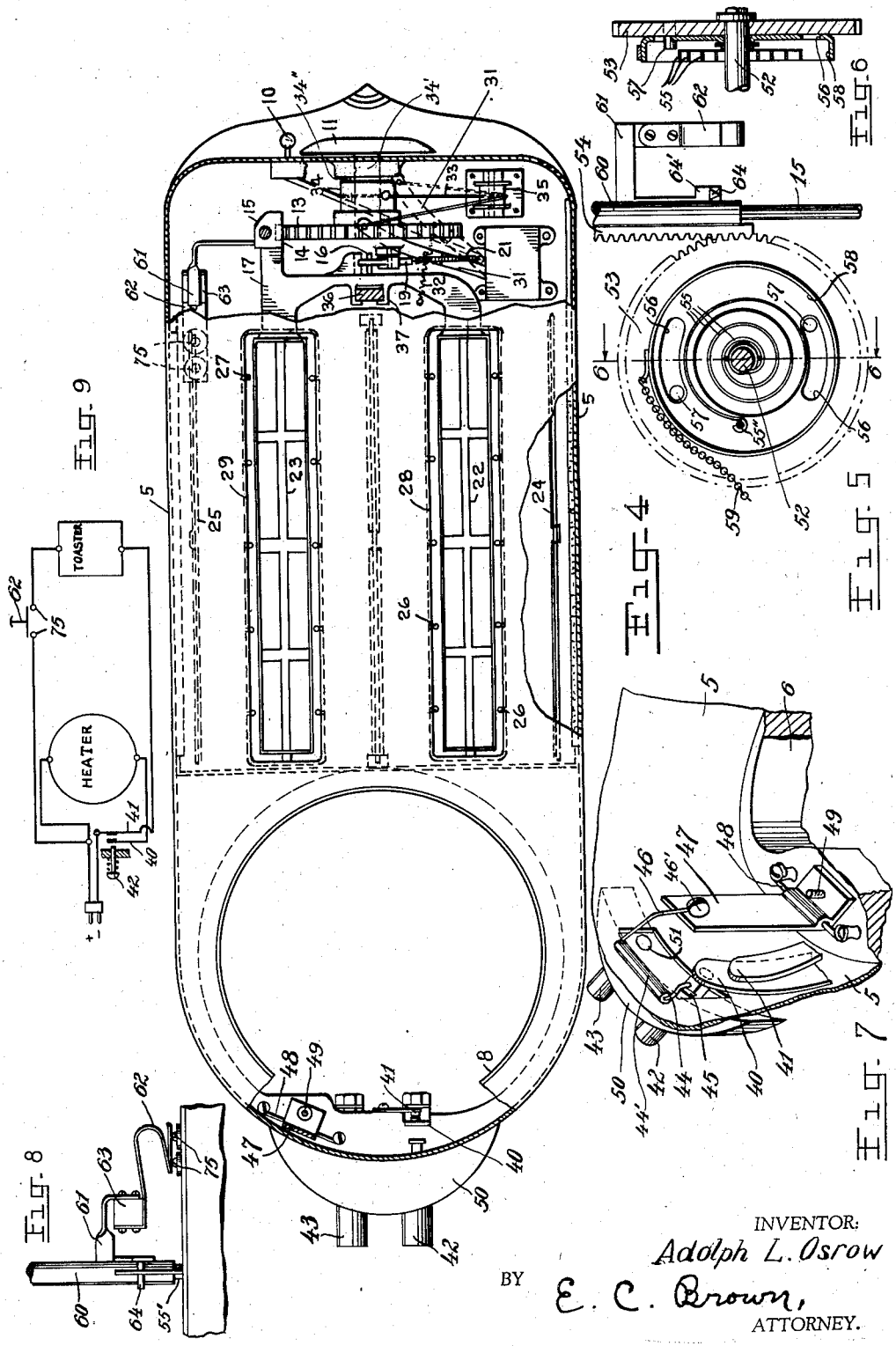

Patented Apr. 4, 1944

2,345,769

UNITED STATES PATENT OFFICE 2,345,769

ELECTRIC TOASTER AND COOKER

Adolph L. Osrow, Jamaica, N. Y.

Application October 16, 1940, Serial No. 361,407

4 Claims. (Cl. 99—327)

The invention relates to cookers and toasters, and more particularly to an electrically operated device of this character which combines in its construction a toaster and a percolator or other cooking utensil.

One of the principal objects of the invention is to provide a device in which toast and coffee may be made at the same time.

Another object is to provide such a device which may be used either individually for one purpose at a time, or for making toast while coffee is being made or other food cooked or heated in a cooking utensil.

Another object is to so arrange the device that bread may be inserted and toasted and the toast removed, without disturbing a coffee pot or other utensil in place upon the heater provided therefor, and at the same time to permit the current to said heater to be shut off when no longer needed and the contents of the pot kept hot by heat remaining in the heating unit as well as by heat from the toaster elements. By this arrangement, coffee remaining in the pot may be kept hot until wanted or the preparation of same completed, and slices of bread toasted at the same time as they are needed while a meal is being eaten.

Another object is to provide a device which is economically operated; while the coffee is made the heat penetrates into the toasting compartment and while making the toast the coffee is preheated thereby consuming less current.

Another object is to provide such a device in which the heating unit or grill is located within a vertical shell serving to retain a coffee pot or other utensil in an upright position and avoid the danger of it being accidentally upset.

Another object is to provide means whereby the slices are projected from the device upon completion of the toasting, and for automatically closing the circuit through which current flows to the toasting elements when the slice-holding means are retracted and breaking said current when the slices are projected.

Another object is to provide adjustable means for controlling the time such toasting operation shall continue.

Another object is to provide means for automatically shutting off the current from the heating unit of the cooking utensil, when a predetermined degree of heat is attained.

Another object is to provide such a device which is simple, convenient and compact in construction, and attractive in appearance.

Another object is to provide such a device which shall be simple, efficient and convenient in operation, which has relatively few controlling parts and is not liable to get out of order or become inoperative for any reason.

Further objects and advantages of the invention will be in part set forth in the following specification, and in part will be obvious therefrom without being specifically pointed out.

With the above and other objects of the invention in view, the invention consists in the novel construction, arrangement and combination of various devices, elements and parts, as set forth in the claims hereof, certain embodiments of the same being illustrated in the accompanying drawings and described in this specification.

In the said drawings,

Fig. 1 is a perspective view of one embodiment of my invention;

Fig. 2 is a front view of the same, a portion of the outer casing being broken away;

Fig. 3 a side view, partly in section;

Fig. 4 is a plan view of the same, partly in section and the shell being partly broken away;

Fig. 5 is a fragmentary view on a relatively enlarged scale of certain portions of the means controlling the toasting operation;

Fig. 6 is a sectional view along the line 6—6 of Fig. 5;

Fig. 7 is a fragmentary view showing means for controlling the flow of current to the heating unit of the percolator;

Fig. 8 is a fragmentary view of a portion of the means controlling the flow of current to the toasting elements;

Fig. 9 is a wiring diagram of the device;

Fig. 10 is a fragmentary view showing a modified form of a latch forming part of the controlling means of the toaster;

Figs. 11, 12 and 13 illustrate auxiliary means controlling the current of the cooking chamber; and Fig. 14 is a detail view of a modified portion of the cooker switch.

In carrying my invention into effect in the embodiment shown in Figs. 1 to 4, 7, 8 and 9, I provide an outer shell or casing 5 and a base 6. The base 6 may be made of suitable plastic material, formed to receive the various parts of the device, and is provided with a metal bottom plate 6' and supporting feet 6''. The casing 5 as shown is formed of sheet metal. Insulation 5' is shown in Figs. 2 and 4, but it will be understood that the same is not essential, as ordinarily the mica used as a part of the toasting elements hereinafter mentioned, is sufficient for the purpose.

8 indicates a cylindrical vertical shell, mounted within the casing 5, toward the rear thereof, and 9 a heating unit of ordinary or any suitable type. 8' indicates a coffee pot which may be placed within said shell 8 to stand upon said heater, 8" indicating its cover, and 7 its handle. 9' and 9" indicate wires connected to said heater, shown broken away in Fig. 3. The means for controlling the flow of current to said heater will be described below.

At the forward portion of the device are located the toasting means and the means for controlling the flow of current thereto. The bread to be toasted is supported upon an elevator, comprising supports 22 and 23, the forward ends of which slide in vertical slots in the wall 78 and are connected to or integral with a cross piece 17, and the rear ends of which pass through vertical slots in the inner wall 77. When the elevator is lowered the slices stand between wire guides 26, 26, and 27, 27, and heating elements 24, 24, and 25, 25. When the elevator is raised, by means below described, the toast is projected through openings 28 and 29 in the top of the device, the current being at the same time shut off. The elevator is also guided at its central portion by a vertical bar 36, with which engages a guide portion 37 of the elevator (see Figs. 3 and 4), thus insuring smooth vertical travel of the elevator, although the latter is operated at one side only by the gear 13 and rack 14 as shown.

At the front of the device is a hand piece 11, secured to the rectangular outer end of a shaft 12, which shaft also carries a gear wheel 13, which meshes with a rack 14, sliding on a rod 15 and connected to the cross piece 17. Mechanism below described tends to raise the rack, and thereby the toast elevator. When the hand piece 11 is rotated clockwise, the rack 14 is carried downward by the gear 13 until a pin 16 on the cross piece 17 passes below the hook 18 of a catch 19, which is pivoted at 20 and the lower end of which is normally pulled toward the left (see Fig. 2) by a spring 21; the pin 16 is therefore engaged and held by the hook 18 until released as below described.

A timing device or clock mechanism, of well-known or any suitable type, is located at 38, and may be adjusted to the length of time desired for the toasting operation, by means of lever 10 (shown broken away in Fig. 3 and omitted for clearness from Fig. 2), which adjustment being of conventional type will be well understood, the lever being moved to the right to increase the time and produce a darker toast and toward the left for a lighter toast. When the time arrives for which the clock mechanism has been set, a lever 31, mounted in said timing device, is operated thereby and, acting under the tension of a spring 32 (see Fig. 4) moves rearwardly so that the same strikes the lower end of the catch 19 and causes the hook 18 to release the pin 16, thus allowing the elevator to be raised, and thereby projecting the toasted slices upwardly through the top openings 28 and 29, from which they may be readily removed.

A cord or chain 33 is secured at one end to a drum 34 upon the shaft 12, passes around a pulley 35, and has its other end secured at 39 to the lever 31. When the hand piece 11 is turned clockwise, the turning of the drum 34 pulls the said cord or chain 33 and thereby the lever 31, thus rewinding the clock mechanism for the next toasting operation.

In Figs. 5 and 6 I have shown, on a relatively enlarged scale, mechanism connected with the gear wheel and rack for raising and lowering the toast-supporting means. The form shown in these figures is modified in its proportions and certain details from the form shown in the main figures of the drawings, but the mechanism is similar and operates in the same manner in both cases. In said Figs. 5 and 6, 52 indicates the shaft, which is squared at its outer end to receive the hand piece 11; 53 indicates the gear wheel, and 54 indicates the rack, mounted upon or integral with a sleeve 60, which slides vertically upon the rod 15. At the right of Fig. 5 is shown the automatic switch for the toasting circuit, below described, and also a pin 64 extending from a lug 64', which co-operates with the latch illustrated in Fig. 10 and will be below described. 59 indicates a chain, analogous to the chain or cord 33 and operating in substantially the same manner. 58 indicates a drum, the rear surface of which lies adjacent the gear wheel 55, and the open front of which lies adjacent the front wall of the casing 5 (not shown in these figures). This drum corresponds to drum 34, and within the drum, in either case, is a spring 55, one end of which is secured to the shaft and the other end to a fixed point in the device; in the form shown in Figs. 5 and 6 said end is secured at 55" to the front wall of the casing, and in Fig. 4 the same is secured to a pin 34" extending from fixed sleeve 34'. The drum 58 is fast upon the shaft 52, and rotates therewith; the gear wheel 53 is loose on the shaft. Pins 57 on the gear wheel extend into slots 56 in the inner face of the drum.

Fig. 5 illustrates this mechanism with the elevating rack at its highest position. Spring 55 tends to turn the drum 58 in a counterclockwise direction, therefore when the hand piece 11 is not operated the drum would be turned further toward the left than shown, and the opposite ends of slots 56 would lie against pins 57.

When the hand piece 11 is turned in a clockwise direction, the shaft 52 is turned, and brings the drum first into the position shown in Fig. 5; as the operation is continued, the ends of slots 56 engage the pins 57 in the manner shown in Fig. 5, and the drum thereby rotates the gear wheel 53, which in turn lowers the rack 54 until the elevator is latched in its lowered position; at the same time, the rotation of the shaft winds the spring 55, and the rotation of the drum pulls the chain 59, thereby winding the clock mechanism; the lowering of the rack also closes the switch 62 and starts the toasting operation.

As soon as manual pressure upon the hand piece 11 is removed, the pressure of the spring 55 moves the drum counterclockwise relatively to the gear wheel, a distance corresponding to the length of the slots 56. This allows the chain 59 to become sufficiently slack to permit motion of the timing lever 70 (or 31 as the case may be) of the clock mechanism, to which the lower end of the chain is attached. When the operation of the clock mechanism operates the timing lever and releases the latch, thereby making it possible for the toast-elevator to rise, the spring 55 further rotates the shaft 52, thereby rotating the drum and by means of the pins 57 rotating the gear wheel 53, and consequently raises the rack 54, thus causing the toast to project through the top of the device, and at the same time breaking the circuit through the switch 62.

In the main form of the device, the operation is similar, and will be well understood from what has been said in explanation of the detail views.

When the elevator is in its lowered position, the circuit to the heating elements of the toaster is closed through a switch 62 (see Fig. 4 and also detail view Fig. 8). This switch comprises a resilient metal strip, preferably formed substantially as shown, which is carried by an arm 61 which is connected to and rises and falls with the rack 14 (or 54, above described, as the case may be), being insulated from said arm by a block 63 of insulating material. When the elevator is lowered to commence the toasting operation, the strip 62 bears against contact points 75, 75, and closes the circuit therebetween, allowing current to pass to the heating elements of the toaster. When the timing device releases the catch 19 and the elevator rises, the circuit is broken by the rising of member 62, and the toasting thereupon ceases.

It will therefore be seen that upon placing fresh slices in the devices to be toasted, and turning the hand piece 11 clockwise, the elevator is thereby lowered and by the same operation the timing device is wound, and the circuit to the toasting elements is closed; and that upon the time expiring for which the timing device has been set, the elevator is raised, the toast is projected through the top of the device for convenient removal, and the circuit to the toasting elements is automatically broken.

The flow of current to the heater for the coffee pot (or other cooking utensil) placed within the shell 8, is controlled through a switch and connected parts, best shown in Fig. 4 and the detail view Fig. 7, although also indicated at the left of Fig. 3. This switch comprises resilient contact arms 41 and 42, mounted upon the inner portion of the base 6 and electrically connected as indicated in the wiring diagram, Fig. 9 Push-buttons 42 and 43 are mounted in a member 50, secured to the casing 5, and extend therethrough; said push-buttons are operated independently of each other, and are normally held in their outward positions by springs (not shown) within the member 50. When the button 42 is pushed inwardly, its inner end bears against the arm 40, and in turn presses it against the arm 41, thus closing the circuit to the heater. A member comprising integral arms 44 and 46 is swingingly mounted in a sleeve 44'; the arm 46 being provided with a weight 46'. When the button 42 is pushed in, the end of arm 44 falls by gravity into and engages with a transverse groove 45 near the inwardly projecting end of the button 42, and holds it in its circuit-closing position, until released as below mentioned.

An L-shaped bimetallic thermostatic element 47 is mounted on a rod 48, and is pivotally adjustable thereon by a set-screw 49, operated from the bottom of the device and passing through the short lower arm of the thermostatic element. This screw is preferably adjusted as desired at the time of assembling the device, and not changed thereafter. The longer arm of the thermostat stands approximately upright, and as the thermostat is affected by the heat of the unit 9 and the contents of the pot 8', the element 47 bends inwardly. When the predetermined degree of heat is reached, thus coming in contact with the inclined arm 46 and raising the same, consequently at the same time raising the integral arm 44 and releasing the latter from the groove 45; this permits the push-button 42 to move outward by the force of its spring, thereby permitting the resilient arm 40 to separate from the arm 41, which separation breaks the circuit to the heating element 9.

Should it be desired to break the circuit manually instead of automatically, the push-button 43 is pressed, its end then extending inwardly through perforation 51 and against the upper part of inclined arm 46, thus raising both the arm 46 and the arm 44 and breaking the circuit in the same manner as above described. The button 43 then returns to its outward position as soon as released from manual pressure.

The device as above described is adapted for the making of toast and coffee, at the same time or separately, and the thermostat controlling the flow of current to the heater for the coffee pot is adjusted to break that circuit when the contents of the coffee pot has reached the desired temperature. It may be desired, however, to continue cooking in the part of the device primarily intended for coffee, for instance if desired to substitute another utensil and boil eggs, cook cereal, or to perform any other cooking requiring a longer time than that for which the thermostat is adjusted. The modification shown in Figs. 11, 12 and 13 permits the push button 42 to be held in its circuit-closing position, regardless of the operation of the thermostat. This is done by turning the catch 82, rotatably mounted upon the member 50, by means of the knurled knob 81, and engaging said catch with slot 80 in the push button, thereby holding the latter in its inward position as long as cooking is desired to continue.

At the bottom of the casing, a trap door 72 is provided, to permit easy removal of crumbs from the toaster, through the opening 73 in the base 6, said door being normally held in closed position by a spring 74.

In Fig. 10 is illustrated a modified form of latch for holding the toaster in its lowered position. A triangular pin 64, is mounted in a lug 64', to take the place of pin 16 previously described. A latch 65 is pivotally mounted at 68; its upper end is tapered as indicated, and is provided with a notch 66. The latch also comprises an arm 67 extending toward the left, and is of sufficient weight to cause the latch to always tend to tilt by gravity toward the left, when permitted to do so. The lower edge of said arm is downwardly curved toward the right. When the elevator is lowered to its full extent, the pin 64 passes the tapered upper end and is engaged by the notch 66 and held in such position, until the lever 70, connected with the clock mechanism and corresponding to lever 31, passes to the right and raises the arm 67 a sufficient distance to move the upper end toward the right and releases the pin 64 from the notch 66. When so released, the spring 55 above described, operates to raise the rack and project the toast, at the same time breaking the toasting circuit.

As shown in the drawings and as above described, a chain or cord, 33 or 59, is employed to wind the clock mechanism. If desired, a lever operated from the mechanism connected with the hand piece 11 might be substituted therefor.

In Fig. 14 a modified form of arm is shown, analogous to arm 44—46. This is in all respects similar and operates in the same way, except that it is adapted to be actuated by a thermostat 47' which is constructed and mounted to bend outward rather than inward relative to the outer shell 5. Furthermore, the upward direction of the arm 46' permits the thermostat to be placed higher in the device, being mounted, if desired, upon a block secured to the base 6. This results in the thermostat being more closely controlled by the heat of the contents of the utensil 8, and being less affected directly by the heat of the heating unit 9.

The operation of the invention has been described in connection with the above description of the construction of the same.

Many of the advantages of the invention have also been pointed out in what is above said with regard to the objects, construction and operation of the invention, and further advantages will be evident to those familiar with electric toasters and cookers, without being specifically mentioned.

I do not limit myself to the particular details of construction set forth in the foregoing specification and illustrated in the accompanying drawings, as the same refer to and set forth only certain embodiments of my invention and it is obvious that the same may be modified, within the scope of the appended claims, without departing from the spirit and scope of the invention.

Having thus described my invention, what I claim as new and desire to secure by Letters Patent, is as follows:

1. An electric toaster, comprising a body having an opening in its top for inserting and removing slices, electric heating means, movable slice-supporting means, timing mechanism, and means controlled thereby adapted to raise said slice-supporting means and thereby cause an edge of a slice of toast to project through said opening and to control the flow of current to the heating means of said toaster, comprising a rack connected to said slice-supporting means, a gear wheel meshing with said rack, a spring tending to rotate said wheel to raise said rack, a catch adapted to hold said slice-supporting means in lowered position, means connected with said gear wheel for winding said timing mechanism when said wheel is rotated to lower said slice-supporting means, means connected with said slice-supporting means for closing the circuit to said heating means when said slice-supporting means is in its lowest position, and means connected with said timing mechanism for releasing said catch at a predetermined time, thereby causing said slice-supporting means to rise by the action of said spring and causing said circuit to be broken.

2. An electric toaster comprising a body having an opening in its top for inserting and removing slices, movable slice-supporting means, heating means, timing mechanism, and means controlled thereby adapted to raise said slice-supporting means and thereby cause an edge of a slice of toast to project through said opening and to open and close the circuit to said heating means, comprising a rack connected to said slice-supporting means, a shaft mounted in said body, a gear wheel loose on said shaft and meshing with said rack, a drum adjacent said gear wheel and fast on said shaft, pins on said gear wheel engaging with slots in said drum, a handle for operating said shaft, means connected with said drum for winding said timing mechanism when said wheel is rotated to lower said slice-supporting means, a latch for holding said slice-supporting means in its lowest position, a spring connected at one end to said drum and at the other end to a fixed point in the device and tending to rotate said gear wheel to slacken said timemechanism winding means and when said catch is released to raise said slice-supporting means, means on said slice-supporting means for closing said circuit when in its lowest position, and means connected with said timing mechanism for releasing said latch at a predetermined time and thereby causing said slice-supporting means to rise by the action of said spring and simultaneously breaking the circuit to the heating means of the toaster.

3. An electric toaster comprising a body having an opening in its top for inserting and removing slices, movable slice-supporting means, heating means, timing mechanism, and means controlled thereby adapted to raise said slice-supporting means and thereby cause an edge of a slice of toast to project through said opening and to open and close the circuit to said heating means, comprising a rack connected to said slice-supporting means, a shaft mounted in said body, a gear wheel or the like on said shaft meshing with said rack, a handle for manually operating said shaft, means for winding said timing mechanism when said wheel is rotated to lower said slice-supporting means, a latch engaging said slice-supporting means when in operative lower position, means connected with said timing mechanism for releasing said latch at a predetermined time, and a spring operating to cause said slice-supporting means to rise automatically when released by said latch and to simultaneously break said circuit to the heating means of the toaster.

4. The construction defined in claim 1, together with manually operated means for releasing said latch, causing said toast-elevating means to operate, and thereby breaking said circuit.

ADOLPH L. OSROW.